INVENTOR
Charles C. Vitello

Dec. 5, 1961 C. C. VITELLO 3,011,344
FLUID METERS
Filed Nov. 21, 1957 2 Sheets-Sheet 2
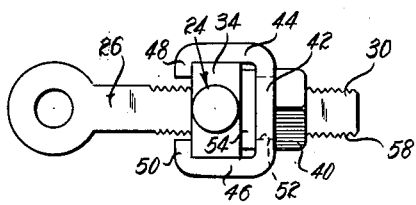
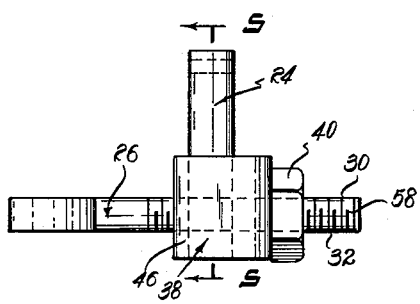
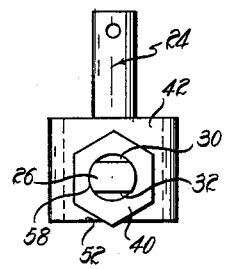
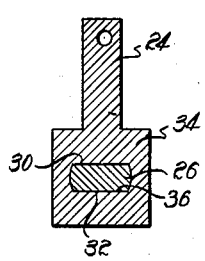
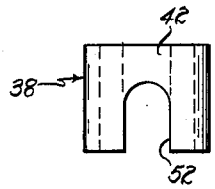
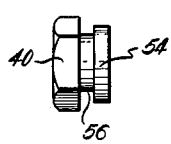
INVENTOR
CHARLES C. VITELLO
BY
ATTORNEYS United States Patent Office 3,011,344
Patented Dec. 5, 1961

3,011,344
FLUID METERS
Charles C. Vitello, Anita, Pa., assignor to Rockwell Manufacturing Company, Pittsburgh, Pa., a corporation of Pennsylvania
Filed Nov. 21, 1957, Ser. No. 697,947
8 Claims. (Cl. 73—281)

This invention relates to gas meters and more particularly to a novel tangent arm adjustment means for gas meters.

In gas meters, such as the type illustrated and described in U.S. Patent No. 2,544,665, issued March 13, 1951, the effective length of the tangent arm is determined by the position of a pivot post mounted on the tangent arm. The pivot post is held in fixed position along the axis of the tangent arm between two nuts threaded on the tangent arm which are tightened against the pivot post mounting. To change the position of the pivot post along the axis of the tangent arm, the two nuts must first be loosened and the pivot post moved to its desired position. The pivot post is then fixed in its new adjusted position by again tightening the nuts.

As is obvious from the above procedure, before an adjustment of such a tangent arm can be made, it is necessary to remove a large section of the gas meter housing to expose the tangent arm. The section of housing removed has a gasket at the mating surfaces and is held by a plurality of bolts to provide a uniformly tight clamping pressure to prevent leakage of gas from the meter housing.

Whenever it becomes necessary to make an adjustment to the tangent arm, it is a time consuming task to remove a section of the gas meter housing, loosen the tangent arm nuts, get the pivot post in correct position, tighten the tangent arm nuts, and then carefully replace the section of meter housing in a manner which will insure against gas leaks. The number of gas meters which may be adjusted by a service man in a day is limited when the above procedure must be followed.

An object of this invention is to provide a novel tangent arm adjustment means for gas meters wherein adjustment may be quickly accomplished without disassembly of the meter and preferably by manipulation of a single member.

A further object of this invention is to provide a gas meter having a novel tangent arm adjustment means wherein adjustment may be quickly accomplished by rotation of a single nut; the housing of the gas meter having a small opening therein through which a tool may be inserted to rotate the adjustment nut.

These and other objects of the invention will become more fully apparent by reference to the appended claims and as the detailed description proceeds in reference to the accompanying drawings in which:

FIGURE 2 is a top plan view of the tangent arm and pivot post mounted on the tangent arm;

FIGURE 3 is a side view of the tangent arm and pivot post mounted on the tangent arm;

FIGURE 4 is an end view of the tangent arm and pivot post mounted on the tangent arm;

FIGURE 5 is a view of the pivot post taken in the direction of arrows 5—5 in FIGURE 3;

FIGURE 6 is an end view of the clamping member; and

FIGURE 7 is a side view of the elastic stop-nut.

Figure 1:
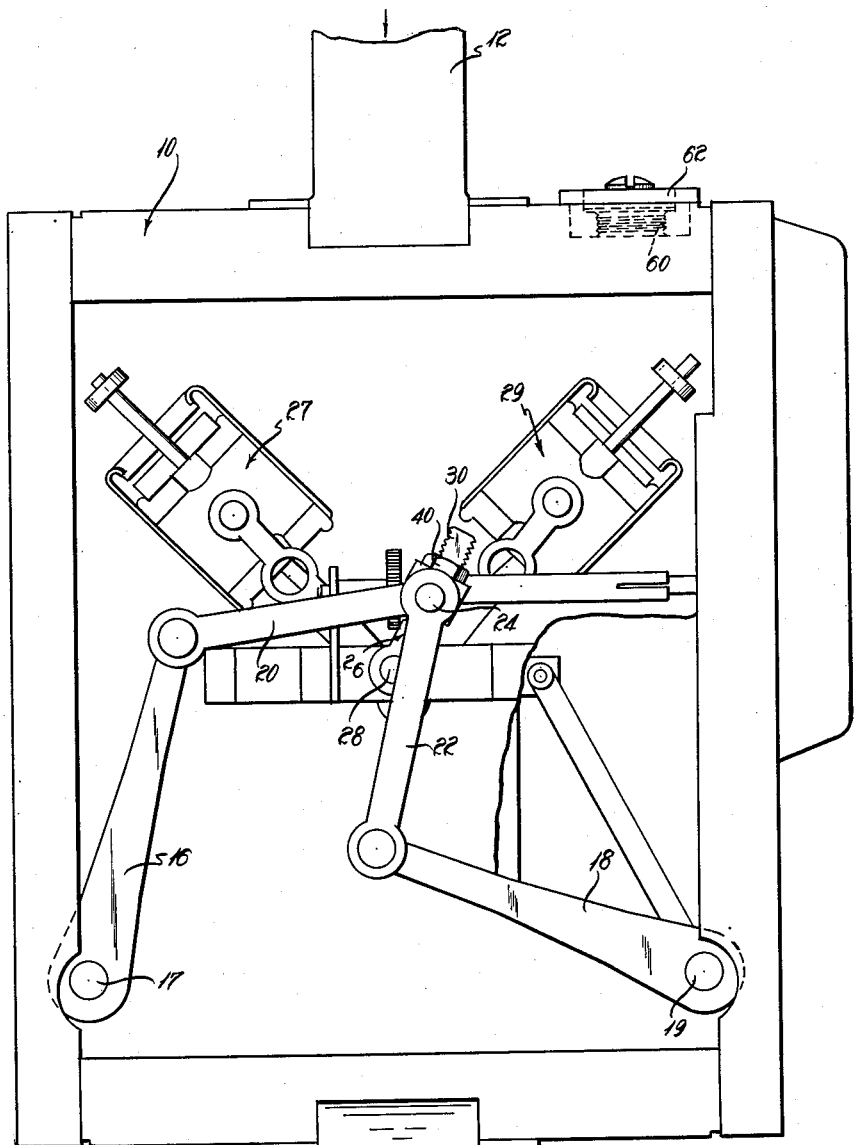
FIGURE 1 is a top plan view of a gas meter with the cover removed.

Referring now to FIGURE 1 of the drawing, there is illustrated a gas meter 10 having a gas inlet 12 and a gas outlet 14. Flag arms 16 and 18 are rigidly connected to the upper ends of flag rods 17 and 19 respectively which are actuated by a bellows of the type illustrated and described in U.S. Patent No. 2,544,665, issued March 13, 1951. The flag arms 16 and 18 are connected to pivot post 24 by means of links 20 and 22, respectively.

The pivot post 24 is adjustably mounted on a tangent arm 26 which is rigidly connected to the end of a crankshaft 28 which actuates slide valves 27 and 29. The tangent arm 26 has diametrically opposed upper and lower flat sides 30 and 32 as shown in FIGURES 2 and 3. The pivot post 24 has a rectangular base 34. Extending through the base 34, perpendicular to the axis of post 24, is a broached hole 36. The configuration of hole 36 conforms with the flat sides 30 and 32, in order that pivot post 24 may be slidably mounted on tangent arm 26.

The pivot post 24 is adjustably fixed in a desired position along the axis of tangent arm 26 by means of a resilient U-shaped channel clamp 38 and a lock nut 40, preferably an elastic stop-nut. The U-shaped channel clamp 38 has a base 42 and substantially parallel legs 44 and 46 extending from and substantially perpendicular to the base 42. The legs 44 and 46 have inwardly turned lips 48 and 50, respectively. In the base 42 of the clamp 38 there is a slot 52 through which tangent arm 26 passes when the clamp 38 is in assembled position.

The elastic stop-nut 40 has an annular shoulder 54 and an annular recess 56. A threaded portion of the nut 40 is provided with a section of hard rubber (not shown) as is well known in the elastic stop-nut art. The rubber prevents "creeping" of the nut which otherwise may be caused by vibration during operation of the meter.

The nut 40 is threaded on arm 26 by threads 58 as shown in FIGURES 2 and 3. The edges of slot 52 in clamp 38 fit in the annular recess 56 to tightly connect the base 34 of pivot post 24 to annular shoulder 54 of stop-nut 40. Through the resilient or spring action of clamp member 38, the base 34 of pivot post 24, and annular shoulder 54 of nut 40 are tightly clamped between the lips 48 and 50 and the base 42 of the clamp member. Thus by rotating elastic stop-nut 40, the pivot post 24 may be adjusted to any desired position along the axis of tangent arm 26. Once adjustment has been made, the pivot post will remain in fixed position until the elastic stop-nut is again manually rotated.

Referring again to FIGURE 1 of the drawing, the housing of gas meter 10 has an opening 60 therein. The opening 60 is sealingly closed by a removable cover 62. The opening 60 is so positioned that when cover 62 is removed, a socket wrench may be inserted through the opening to reach the elastic stop-nut 40. Thus the effective length of tangent arm 26 may be quickly and easily adjusted without removing a large portion of the meter housing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter; a tangent arm having a threaded portion; a pivot post axially slidably and non-rotatably mounted on the tangent arm; means for adjusting the pivot post to a desired position along the axis of said tangent arm; said means comprising a self-locking nut threaded to said tangent arm threaded portion and a means connecting said pivot post to said nut to fix said pivot post relative to said nut axially of said nut while permitting rotational adjustment of said nut relative to said tangent and pivot post; the adjustment being effected by rotation of the lock nut.

2. In a gas meter as defined in claim 1; the lock nut having an annular shoulder and an annular recess; said connecting means fitting in said annular recess and being constructed to clamp said pivot post to the annular shoulder of said nut.

3. In a gas meter as defined in claim 1; the connecting means comprising a resilient substantially U-shaped channel member, the legs of the U-shaped channel member having inwardly turned lips and the base of the channel member having a slot therein; said nut having an annular shoulder and an annular recess; the slot in said channel member fitting in said recess and the shoulder of said nut and the base of said pivot post being clamped together between the lips and base of said U-shaped channel member.

4. In a gas meter; a tangent arm having diametrically opposed flat sides and threads for receiving a nut; a pivot post having a base thereon, a hole extending through said base, the tangent arm extending through said hole to non-rotatably and slidably mount the pivot post on the flat sides of said tangent arm; means for adjusting the pivot post to a desired position along the axis of said tangent arm; said means comprising a resilient clamp rigidly connecting the base of the pivot post to a self-locking nut threaded on and frictionally locked to said tangent arm threads; said clamp comprising a base having two substantially parallel legs extending therefrom, the ends of the legs having inwardly turned lips, and a slot in the base of said clamp; said nut having an annular shoulder and an annular recess; the slot in the base of the clamp fitting in said annular recess; and the base of said pivot post and the annular shoulder of said nut being clamped between the lips and base of said resilient clamp.

5. In a gas meter; a housing for said meter; a tangent arm; a pivot post having a base slidably mounted on the tangent arm; means for adjusting the pivot post to a desired position along the axis of said tangent arm; said means comprising a self-locking nut threaded to said tangent arm and a clamping means connecting said pivot post to said nut; an opening in said housing; a removable cover for said opening; the opening being positioned so that the nut may be rotated by means inserted through the opening when the cover is removed; the adjustment of the pivot post being effected by rotation of the nut.

6. In a gas meter as defined in claim 5; the nut having an annular shoulder and an annular recess; said clamping means fitting in said annular recess to clamp said pivot post to the annular shoulder of said lock nut.

7. In a gas meter as defined in claim 5; the clamping means comprising a resilient substantially U-shaped channel member, the legs of the U-shaped channel member having inwardly turned lips and the base of the channel member having a slot therein; said nut having an annular shoulder and an annular recess; the slot in said channel member fitting in said recess and the shoulder of said nut and the base of said pivot post being clamped together between the lips and base of said U-shaped channel member.

8. In a gas meter, a rotatable tangent arm, a pivot member non-rotatably mounted for translating movement along said arm, means manipulatable to control the relative position of said arm and member including self-locking elastic stop nut means for retaining said manipulatable means in its adjusted position.

References Cited in the file of this patent

UNITED STATES PATENTS

| 876,875 | Henning | Jan. 14, 1908 |
| 1,386,217 | Zilliox | Aug. 2, 1921 |
| 1,827,973 | Dezendorf | Oct. 20, 1931 |
| 1,892,827 | Brower et al. | Jan. 3, 1933 |
| 2,723,699 | Coates | Nov. 15, 1955 |
| 2,733,335 | Falge | Jan. 31, 1956 |